United States Patent
Wolf et al.

(10) Patent No.: US 10,632,909 B1
(45) Date of Patent: Apr. 28, 2020

(54) ALERT METHOD AND ASSEMBLY USING SOUNDS EMITTED FROM AN ELECTRIFIED VEHICLE POWERTRAIN

(71) Applicant: Ford Global Technologies, LLC, Dearborn, MI (US)

(72) Inventors: Christopher Wolf, Ann Arbor, MI (US); Michael W. Degner, Novi, MI (US); Yue Nie, Ann Arbor, MI (US); Seth Avery, Livonia, MI (US)

(73) Assignee: Ford Global Technlogies, LLC, Dearborn, MI (US)

( * ) Notice: Subject to any disclaimer, the term of this patent is extended or adjusted under 35 U.S.C. 154(b) by 0 days.

(21) Appl. No.: 16/157,244

(22) Filed: Oct. 11, 2018

(51) Int. Cl.
*B60Q 9/00* (2006.01)
*B60L 3/00* (2019.01)

(52) U.S. Cl.
CPC .............. *B60Q 9/00* (2013.01); *B60L 3/0061* (2013.01)

(58) Field of Classification Search
CPC ................................ B60Q 9/00; B60L 3/0061
USPC ........................................................ 340/438
See application file for complete search history.

(56) References Cited

U.S. PATENT DOCUMENTS

| | | | |
|---|---|---|---|
| 7,170,400 B2 | 1/2007 | Cowelchuk et al. | |
| 8,174,376 B2 | 5/2012 | Kirmse et al. | |
| 8,320,581 B2* | 11/2012 | Hera | G10K 15/02 381/119 |
| 8,649,887 B2* | 2/2014 | Schulz | H02P 23/04 290/40 D |
| 9,311,910 B2* | 4/2016 | Hera | G10K 11/18 |
| 9,478,214 B2 | 10/2016 | Orth | |
| 2004/0186708 A1 | 9/2004 | Stewart | |
| 2007/0268119 A1* | 11/2007 | Cram | B60Q 9/00 340/457 |
| 2012/0177214 A1* | 7/2012 | Hera | G10K 15/02 381/73.1 |
| 2013/0177167 A1* | 7/2013 | Takahashi | B60Q 5/008 381/86 |
| 2013/0184910 A1* | 7/2013 | Sujan | B60W 10/02 701/22 |
| 2014/0228078 A1* | 8/2014 | Weber | H04M 1/6091 455/569.2 |
| 2015/0197195 A1* | 7/2015 | Hera | B60Q 9/00 381/86 |
| 2016/0352120 A1* | 12/2016 | Lovett | H02J 7/342 |
| 2017/0294127 A1* | 10/2017 | Nakatani | G01S 17/931 |
| 2017/0337915 A1* | 11/2017 | Valeri | G10K 11/175 |
| 2018/0154786 A1* | 6/2018 | Wang | B60L 53/14 |
| 2019/0237092 A1* | 8/2019 | Norton | G10L 21/034 |

FOREIGN PATENT DOCUMENTS

JP 5843687 1/2016

* cited by examiner

*Primary Examiner* — Omar Casillashernandez
(74) *Attorney, Agent, or Firm* — David Kelley; Carlson, Gaskey & Olds, P.C.

(57) ABSTRACT

A vehicle alert method includes, among other things, in response to an alert event, altering at least one characteristic of power delivered within an electrified vehicle powertrain to provide an alert. A vehicle alert assembly includes, among other things, a power characteristic control system that, in response to an alert event, alters at least one characteristic of power delivered within an electrified vehicle powertrain to provide alert.

19 Claims, 5 Drawing Sheets

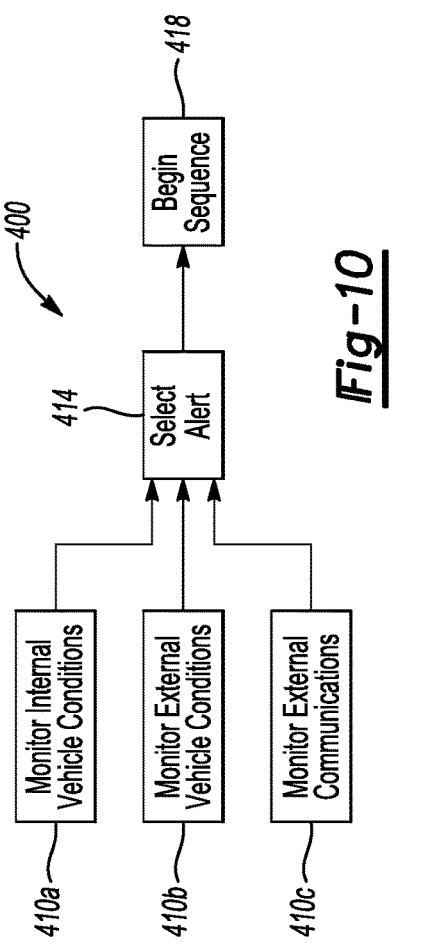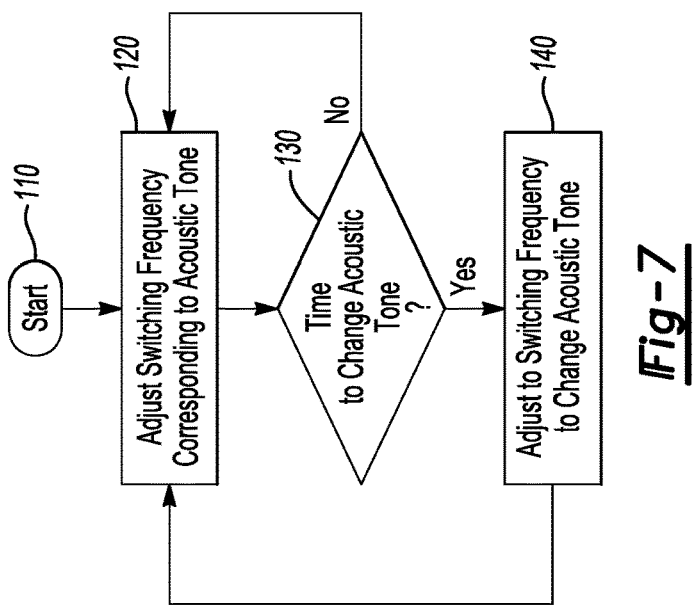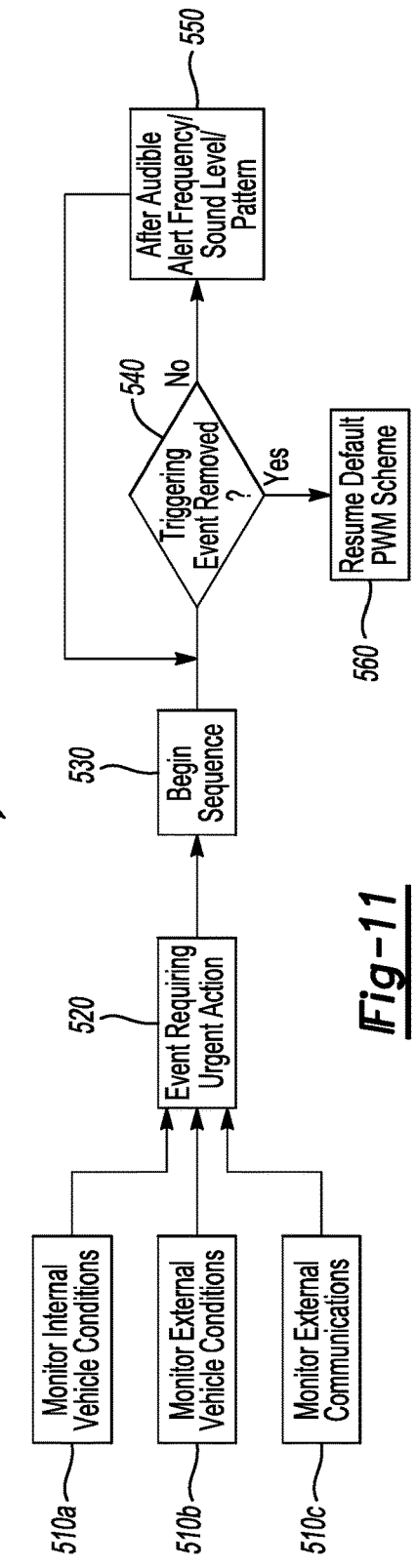

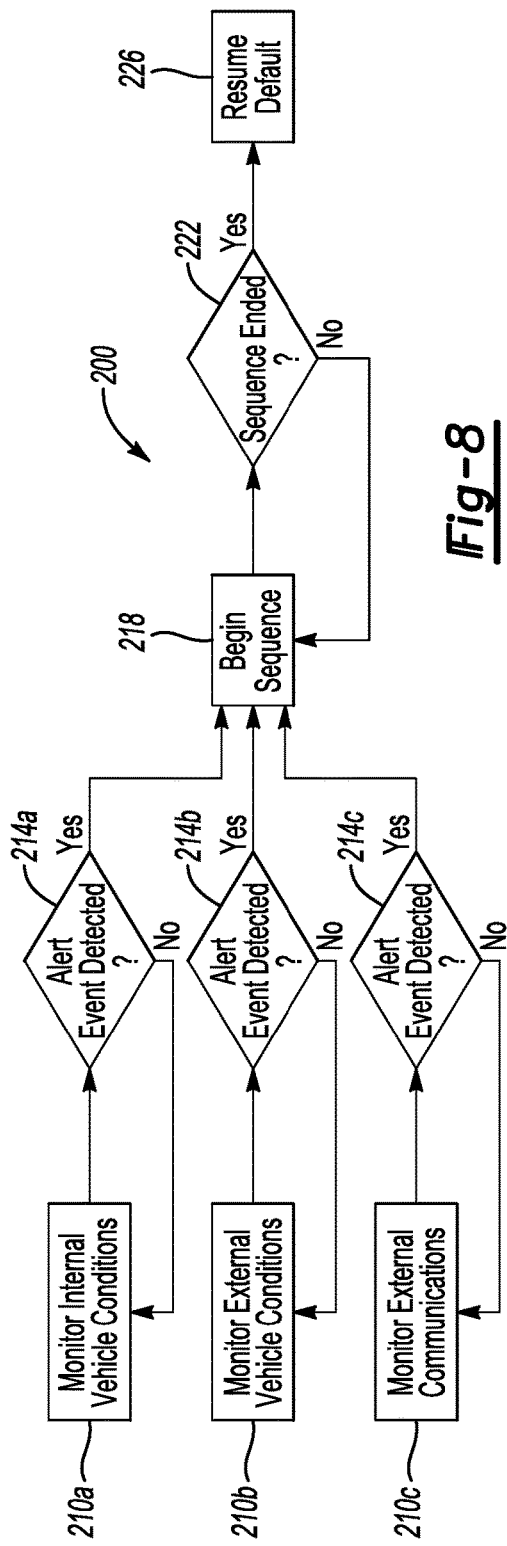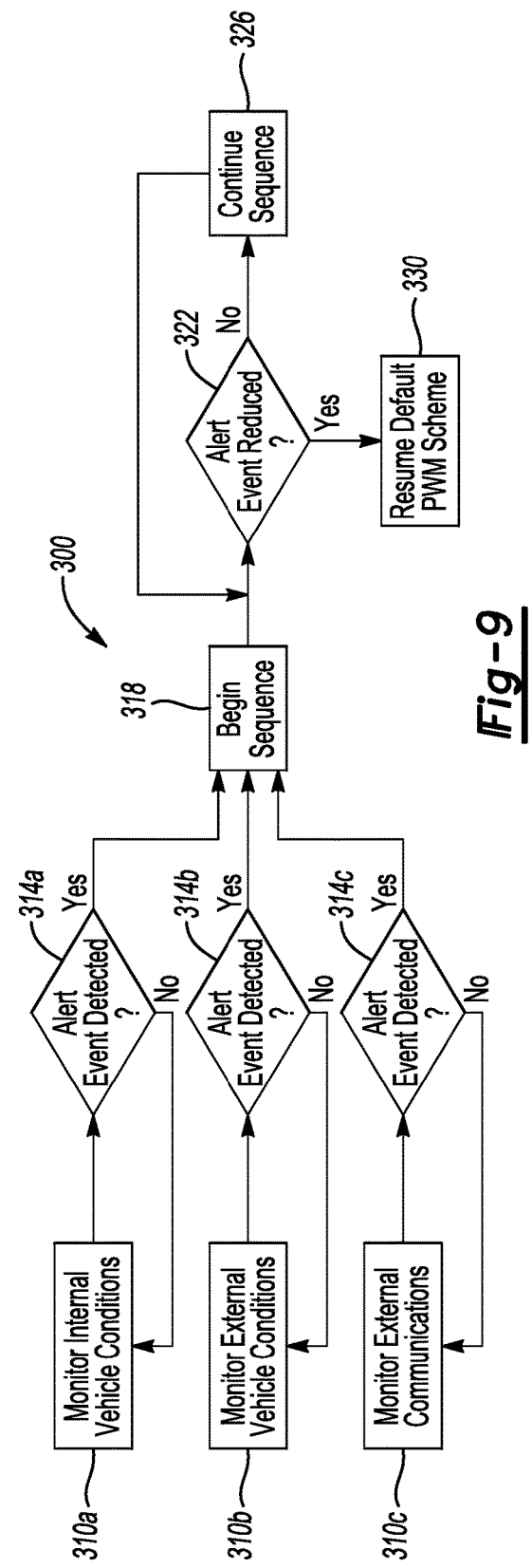

ALERT METHOD AND ASSEMBLY USING SOUNDS EMITTED FROM AN ELECTRIFIED VEHICLE POWERTRAIN

TECHNICAL FIELD

This disclosure relates generally to providing alerts by adjusting sound emitted from an electrified vehicle powertrain.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Electrified vehicles can include an electric drivetrain that includes, among other things, the one or more electric machines and power converters. The electric drivetrain can emit sounds when operating. The sounds can be audible such that an individual can hear the sounds. The individual could instead, or additionally, perceive the sounds as vibrations transmitted through structures of the electrified vehicle.

SUMMARY

A vehicle alert method according to an exemplary aspect of the present disclosure includes, among other things, in response to an alert event, altering at least one characteristic of power delivered within an electrified vehicle powertrain to provide an alert.

In another non-limiting embodiment of the foregoing method, the altering comprises changing a switching pattern of the power when pulse width modulating the power.

In another non-limiting embodiment of any of the foregoing methods, a power output from the electrified vehicle powertrain is maintained during the altering.

In another non-limiting embodiment of any of the foregoing methods, the alert event is a detected change in an internal vehicle condition.

In another non-limiting embodiment of any of the foregoing methods, the alert event is a detected change in a condition external to the vehicle.

In another non-limiting embodiment of any of the foregoing methods, the alert event is sensed by at least one sensor of the vehicle.

In another non-limiting embodiment of any of the foregoing methods, the alert event is a communication to the vehicle from a communication source external to the vehicle.

Another non-limiting embodiment of any of the foregoing methods includes continuing to provide the alert until the alert event is removed.

In another non-limiting embodiment of any of the foregoing methods, the alert is provided by at least one component of the electrified vehicle powertrain emitting a plurality of different acoustic tones that follow a predetermined sequence.

Another non-limiting embodiment of any of the foregoing methods includes selecting the plurality of different acoustic tones, the predetermined sequence, or both based on the alert event.

Another non-limiting embodiment of any of the foregoing methods includes altering the plurality of different acoustic tones, the predetermined sequence, or both based on a duration of the alert event.

In another non-limiting embodiment of any of the foregoing methods, the predetermined sequence includes at least two different acoustic tones.

In another non-limiting embodiment of any of the foregoing methods, the predetermined sequence includes at least one first acoustic tone emitted for a first duration, and at least one different, second acoustic tone emitted for a different, second duration.

In another non-limiting embodiment of any of the foregoing methods, the different acoustic tones comprise different inaudible sounds.

A vehicle alert assembly according to another exemplary aspect of the present disclosure includes, among other things, a power characteristic control system that, in response to an alert event, alters at least one characteristic of power delivered within an electrified vehicle powertrain to provide an alert.

In another non-limiting embodiment of the foregoing assembly, altering the at least one characteristic of the power in response to the alert event causes at least one component of the electrified vehicle powertrain to emit a plurality of different acoustic tones that follow a predetermined sequence.

Another non-limiting embodiment of any of the foregoing assemblies includes an electric machine as the at least one component. The power characteristic control system is configured to alter the at least one characteristic of power delivered to the electric machine.

Another non-limiting embodiment of any of the foregoing assemblies includes a traction battery that powers the electric machine.

In another non-limiting embodiment of any of the foregoing assemblies, the acoustic tones comprise audible sounds and inaudible sounds.

In another non-limiting embodiment of any of the foregoing assemblies, the power characteristic control system alters the at least one characteristic of the power by changing a switching frequency of the power when pulse width modulating the power.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 7 illustrates the flow of an exemplary sound control method.

FIG. 8 illustrates a vehicle alert method utilizing the electrified vehicle powertrain of FIG. 1 according to an exemplary aspect of the present disclosure.

FIG. 9 illustrates a vehicle alert method utilizing the electrified vehicle powertrain of FIG. 1 according to another exemplary aspect of the present disclosure.

FIG. 10 illustrates a vehicle alert selection method according to an exemplary aspect of the present disclosure.

FIG. 11 illustrates a vehicle alert method utilizing the electrified vehicle powertrain of FIG. 1 according to yet another exemplary aspect of the present disclosure.

DETAILED DESCRIPTION

This disclosure relates generally to intentionally changing sounds emitted from powertrain components of an electrified vehicle. The sounds can include audible sounds that a user can hear. The emitted sounds can instead, or additionally, include inaudible sounds that are perceived by the user as vibrations transmitted through physical structures of the electrified vehicle.

The sounds can be varied such that the sounds are emitted as acoustic tones following a predetermined sequence. The user may then perceive the acoustic tones as a melody or song.

Characteristics of power delivered to the powertrain components can be altered by varying characteristics of the power to change sounds emitted from the powertrain components. The altering of the characteristics of the power can include adjusting a switching pattern of the power when pulse width modulating the power. Altering the switching pattern can include altering the switching frequency. The changed sounds emitted from the powertrain components can be used as alerts. Net power delivered to the powertrain components can remain the same before adjusting the switching frequency and after adjusting the switching frequency. Other characteristics of power can include current, voltage, etc.

Figure 1:
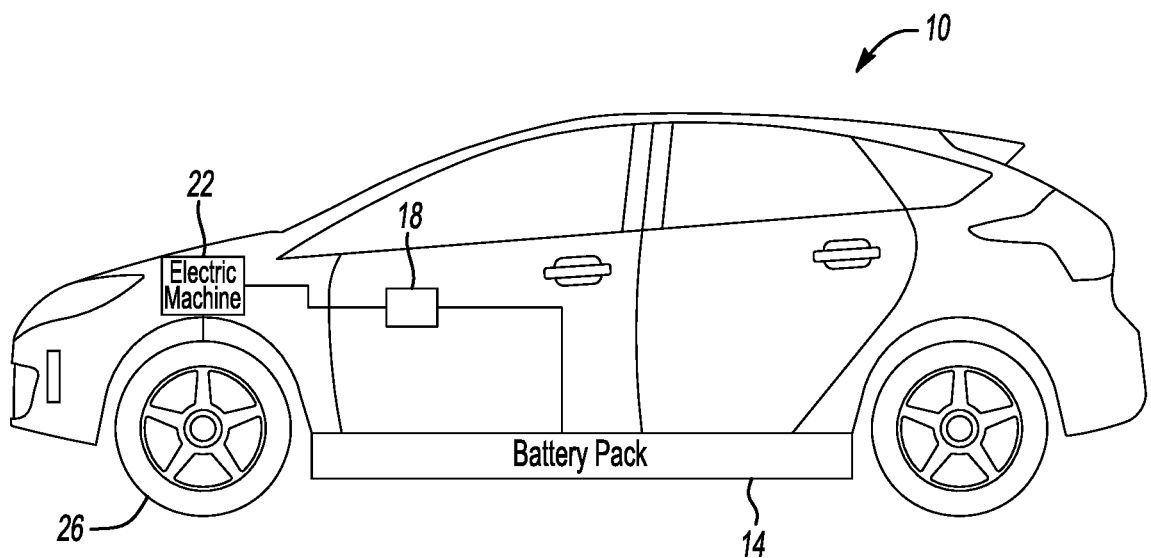
FIG. 1 illustrates a partially schematic side view of an electrified vehicle incorporating an electrified vehicle powertrain according to an exemplary aspect of the present disclosure.

With reference to FIG. 1, an example electrified vehicle 10 includes a traction battery 14, a power characteristic control system 18, an electric machine 22, and vehicle drive wheels 26. The electrified vehicle 10 is a battery electric vehicle (BEV) in this example.

The traction battery 14 powers the electric machine 22. When powered, the electric machine 22 generates torque to drive the wheels 26 that propel the electrified vehicle 10. The power characteristic control system 18 can adjust power provided to the electric machine 22.

The electric machine 22 is a permanent magnet (PM) synchronous motor in this example. In general, the electric machine 22 operates in response to commands from the power characteristic control system 18. The commands can include a voltage command, torque command, speed command, etc.

Although the electrified vehicle 10 is depicted as a BEV, it should be understood that the concepts described herein are not limited to BEVs and could extend to other types of electrified vehicles, including, but not limited to, plug-in hybrid electric vehicles (PHEVs), hybrid electrified vehicles (HEVs), etc. The scope of this disclosure can include any vehicle having an electric machine. That is, the electric machine 22 can be utilized in connection with the electrified vehicle 10, or within the powertrain of another type of electrified vehicle that uses a PM synchronous motor. In another type of electrified vehicle, the electric machine 22 could be utilized as the generator, or as a combined motor-generator.

Figure 2:
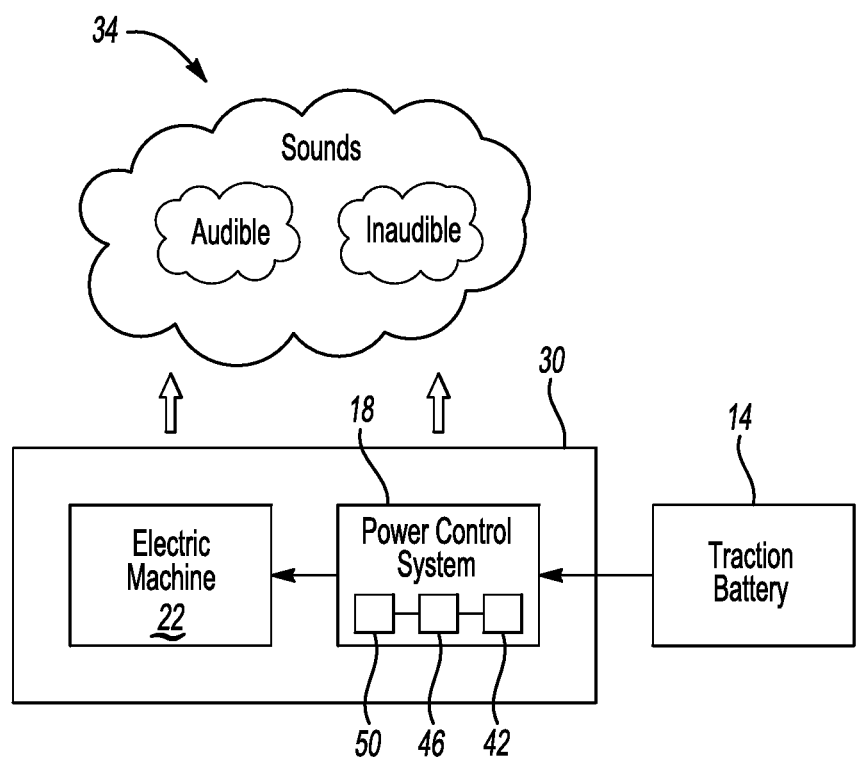
FIG. 2 illustrates a schematic view of selected portions of the vehicle of FIG. 1.

With reference now to FIG. 2, the electric machine 22 and the power characteristic control system 18 provide an electrified vehicle powertrain 30. When the electrified vehicle powertrain 30 is operating, the electrified vehicle powertrain 30 can emit sounds 34. The sounds can include audible sounds, inaudible sounds, or both. A user in a passenger compartment of the electrified vehicle 10, or proximate the electrified vehicle 10 outside the passenger compartment, can perceive the sounds. The user can hear the audible sounds, and perceive the inaudible sounds as vibrations.

The electric machine 22 can generate the sounds 34 during operation. The power characteristic control system 18 can instead, or additionally, generate the sounds 34 during operation.

Altering characteristics of power delivered within the electrified vehicle powertrain 30 can change the sounds 34. To alter characteristics of the power, the power characteristic control system 18 can pulse width modulate power sent to the traction battery 14 from the electric machine 22. Pulse width modulation can control and shape the flow of electrical power to and from various components of the electrified vehicle powertrain 30. Pulse width modulation can change the sounds 34 without having a significant negative impact on the controllability, efficiency, and torque production accuracy of the electrified vehicle powertrain 30.

The pulse width modulation can vary switching frequencies to adjust the power. Typically, in the prior art, switching frequencies are selected to reduce emissions of sound. This disclosure, in contrast to the prior art, describes an exemplary embodiment that varies characteristics of the power delivered within the electrified vehicle powertrain 30 to change the sounds 34 such that the sounds follow a predetermined sequence. The predetermined sequence can correspond to a melody or song, for example.

The power characteristic control system 18 includes a memory portion 42, a processor portion 46, and a switching portion 50. The power characteristic control system 18 can be a standalone controller, or incorporated into a controller system of the electrified vehicle 10, such as an engine control unit (ECU) or motor generator control unit.

To adjust the switching frequencies, the power characteristic control system 18 can include multiple separate controller systems in the form of multiple hardware devices, or multiple software controllers within one or more hardware devices. At least some portions of the power characteristic control system 18 could, in some examples, be located remotely from the electrified vehicle 10, such as when portions of the memory portion 42 are cloud-based.

The memory portion 42, as explained, can be partially cloud-based, or fully cloud-based. In other examples, the memory portion 42 resides entirely within the power characteristic control system 18. The memory portion 42 can include any one or combination of volatile memory elements.

The processor portion 46 of the power characteristic control system 18 can be programmed to execute a program stored in the memory portion 42. The processor can be custom made or commercially available processor, a central processing unit (CPU), an auxiliary processor among several processors associated with the controller system, a semiconductor-based microprocessor (in the form of a microchip or chipset) or generally any device for executing software-based instructions.

The switching portion 50 can include one or more switches that are opened and closed to control a switching frequency. The switches could be semiconductor switches, such as insulated-gate bipolar transistors (IGBTs), which are often used for pulse width modulation.

The program executed by the processor portion 46 could, for example, be stored in the memory portion 42 as software code. The program could include one or more additional or separate programs each of which includes an ordered list of executable instructions for implementing logical functions associated with the power characteristic control system 18.

The logical functions can include controlling the switching portion 50 according to a table stored within the memory portion 42. To adjust switching frequencies of the power during pulse width modulation, the processor portion 46 can command the switching portion 50 to open and close as desired.

Figure 3:
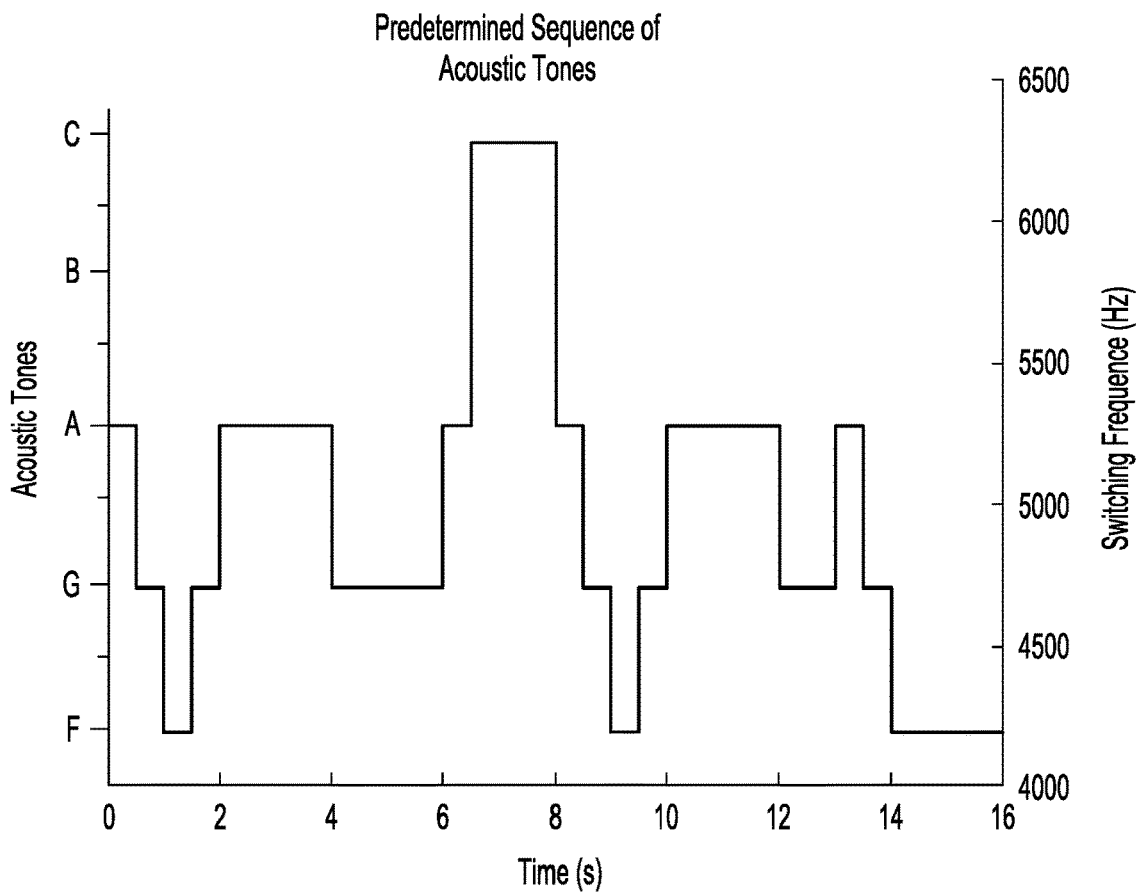
FIG. 3 illustrates a predetermined sequence of acoustic tones.

With reference to FIG. 3, and continued reference to FIGS. 1 and 2, the switching frequencies can be controlled through the power characteristic control system 18 so that the sound from the electrified vehicle powertrain 30 follows a predetermined sequence of acoustic tones. As shown, the predetermined sequence includes a specified acoustic tone and a specified duration for emitting the specified acoustic tone. Through pulse width modulation, both the switching frequency and the duration are adjusted by the power characteristic control system 18. The predetermined sequence of acoustic tones can be stored within the memory portion 42 and accessed as required.

In this exemplary non-limiting embodiment, the acoustic tones of the predetermined sequence correspond to musical notes. In particular, when the switching frequency is 5,250 Hz, the user perceives the sounds as an A note. When the switching frequency is 4,750 Hz, the user perceives the sounds as a G note. When the switching frequency is 4,250 Hz, the user perceives the sounds as an F note. When the switching frequency is 6,250 Hz, the user perceives the sounds as an A note.

When the switching frequencies are adjusted according to the exemplary predetermined sequence of acoustic tones in FIG. 3, the user perceives the sounds emitted from the electrified vehicle powertrain 30 as the melody "Mary Had a Little Lamb."

The range of switching frequencies is from 4000 Hz to 6500 Hz in FIG. 3. In other examples, the range could be from 1 kHz to 10 kHz.

The exemplary predetermined sequence of acoustic tones and associated switching frequencies in FIG. 3 are representative of an operating condition for the electric machine 22 where the electric machine is operating at a relatively constant speed and providing a relatively constant torque.

The switching frequencies resulting in a particular tone from the electrified vehicle powertrain 30 can vary in response to a rotational speed of the electric machine 22, a torque generated by the electric machine 22, or both. Accordingly, to hold a particular acoustic tone, the switching frequency may need to vary as the speed of the electric machine 22 changes, torque applied by the electric machine changes, or both. The switching frequency may need to increase, for example, to continue to hold an A note as the rotational speed of the electric machine 22 increases.

Figure 4:
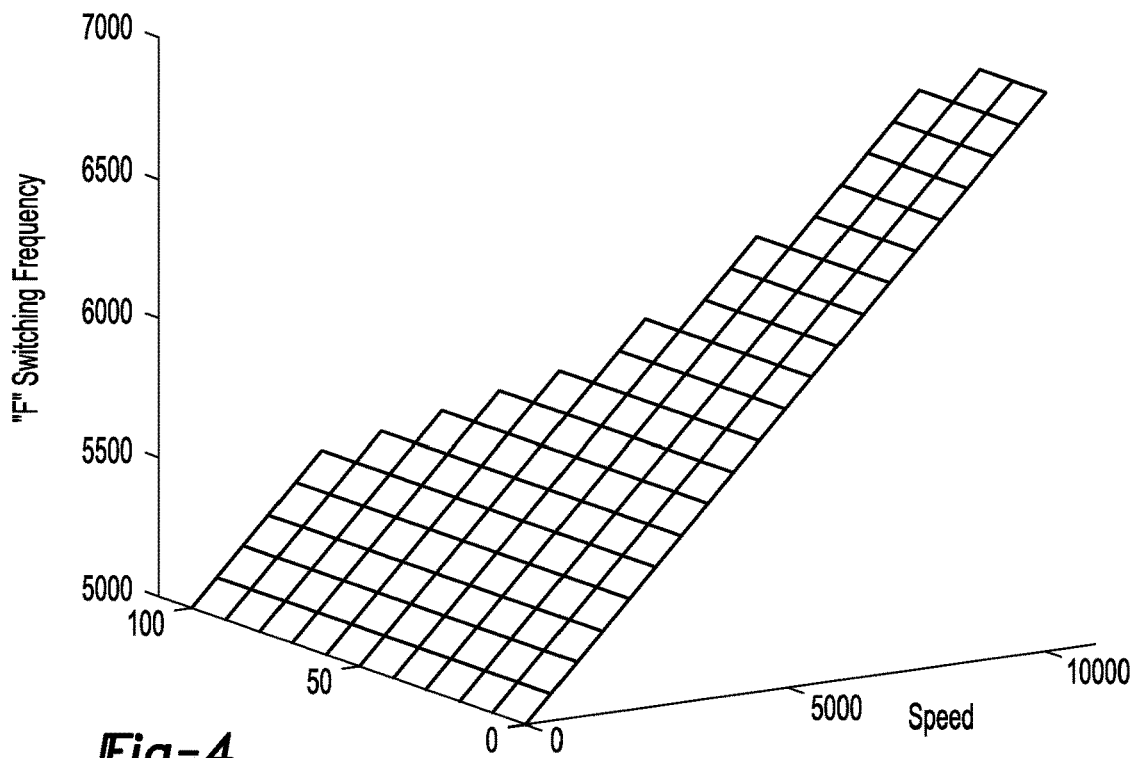
FIGS. 4-6 illustrate plots of switching frequencies for different acoustic tones at various combinations of torque and speed for an electric machine.
Figure 5:
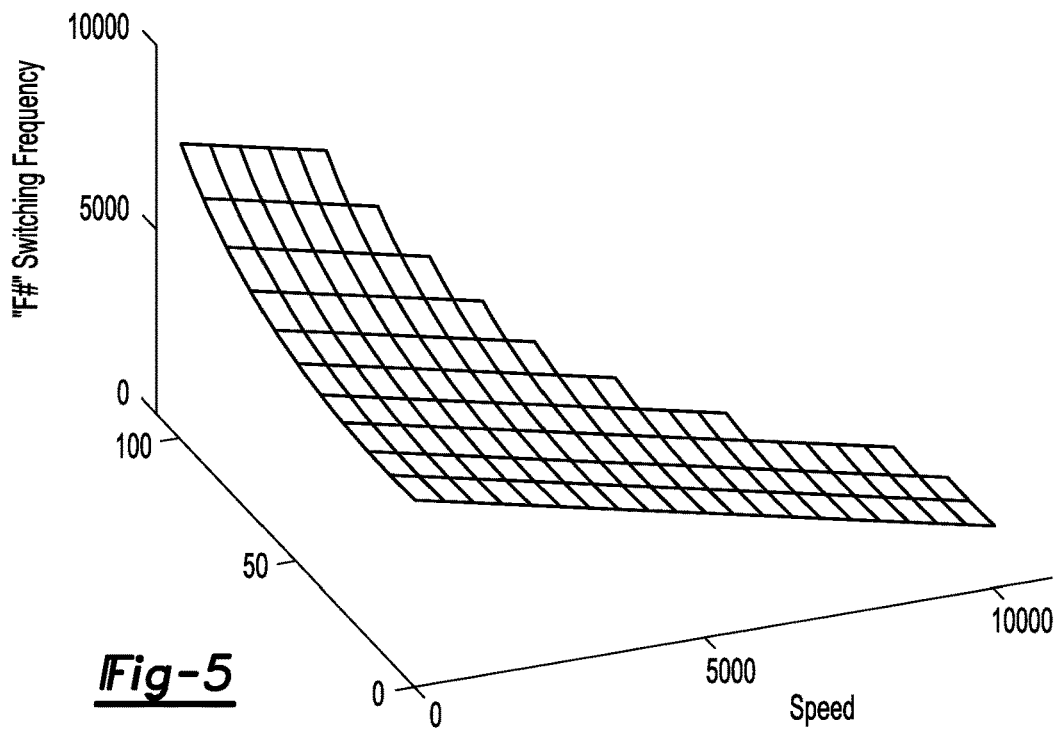
Figure 6:
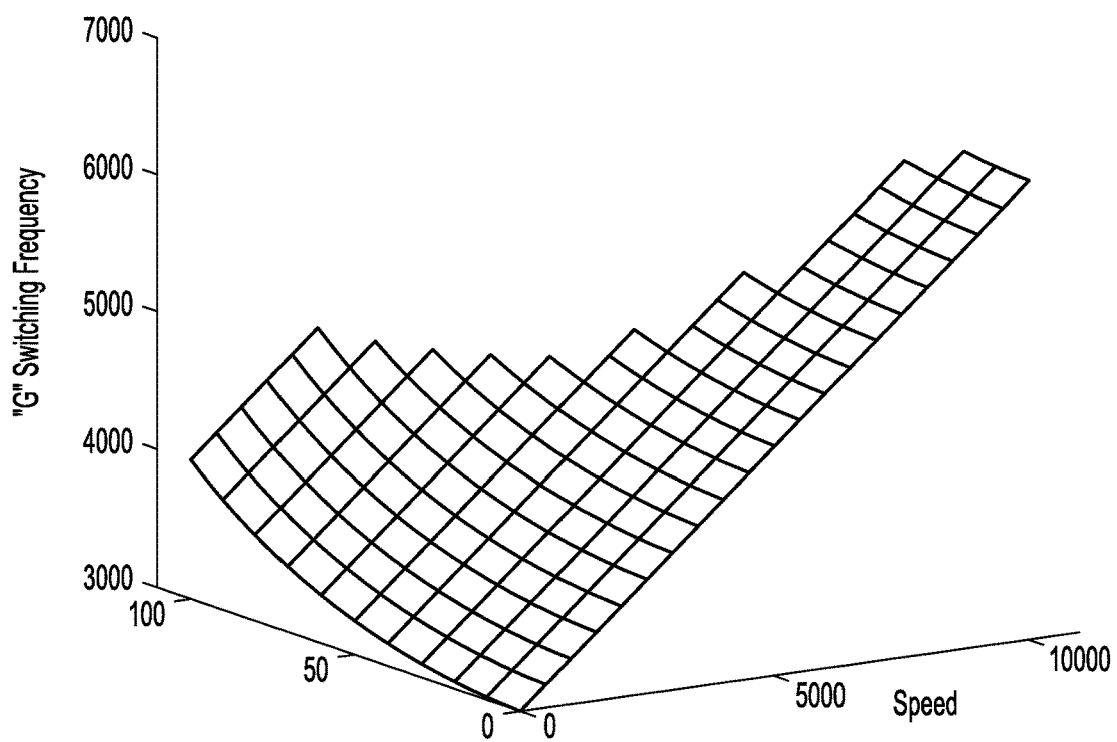

Accordingly, with reference to FIGS. 4-6 and continued reference to FIGS. 2 and 3, the switching frequencies necessary to emit specific tones for various combinations of torque and speed of the electric machine 22 can be stored in a look-up table within the memory portion 42 of the power characteristic control system 18. By referencing the look-up table, the processor portion 46 can command the switching portion 50 to provide a switching frequency corresponding to a specified tone within the predetermined sequence. The commanded switching frequency to produce the specified tone can change depending on the speed and torque of the electric machine 22. For example, the switching frequency can be adjusted as the speed of the electric machine 22 increases to ensure that the specified tone continues to be emitted.

The switching frequencies necessary to emit specific tones for various combinations of torque and speed of the electric machine 22 can be gathered through a calibration process. FIGS. 4-6 show exemplary maps of three specific tones. The calibration process to generate the maps that populate the look-up table could include operating the electrified vehicle powertrain 30 throughout various combinations of electric machine speeds, electric machine torques, and switching frequencies. The sounds emitted through calibration process are measured, associated with a particular acoustic tone, and mapped.

With reference now to FIG. 7 and continued reference to FIG. 2, an exemplary sound control method executed by the power characteristic control system 18 can start at a step 110. The method next adjusts a switching frequency at a step 120 so that the sound emitted from the electrified vehicle powertrain 30 corresponds to a specific acoustic tone. The adjustments may include changing the switching frequency so that the specific acoustic tone continues to be emitted as a speed or torque of the electric machine 22 changes.

Next, at a step 130, the method assesses whether changing the specific acoustic tone is required. This method may reference a predetermined sequence stored in the memory portion 42 when making this assessment. The predetermined sequence indicates which acoustic tone should be emitted and how long that acoustic tone should be emitted.

If the time to change the acoustic tone has not expired, the method moves back to the step 120. If the time to change the acoustic tone has expired, the method moves to the step 140, which adjusts the switching frequency to change the specified acoustic tone to a different specified acoustic tone. The method then returns to the step 120.

Adjusting sound emitted from the electrified vehicle powertrain 30 can provide alerts to a user of the electrified vehicle 10, such as a driver, or an individual near the electrified vehicle 10. In the past, vehicles included alert systems that produce audible sounds broadcast through speakers of the electrified vehicle 10. These audible sounds did not originate from an electrified vehicle powertrain.

An alert from the electrified vehicle powertrain 30 can be provided in response to an alert event. The alert event could be a detected change in an internal vehicle condition, a detected change in an external vehicle condition, or a receipt of an external communications.

Internal vehicle conditions are generally conditions of, and within, the electrified vehicle 10 that are monitored for alert events. Exemplary internal vehicle conditions can include a fuel level or a battery state of charge. With such internal vehicle conditions, the alert event could be the fuel level or battery state of charge falling below a threshold level. Other exemplary internal vehicle conditions that could provide an alert event could include a vehicle fault, a navigation alert, or a smart device alert. In yet another example, the internal vehicle condition is a safety alert. Exemplary alert events provided by safety alerts could include a detected decrease in alertness or health of a driver of the vehicle, or an autonomous vehicle requiring a driver action/takeover.

External vehicle conditions are generally conditions outside the electrified vehicle 10 that are monitored by the electrified vehicle 10 for alert events. Exemplary external vehicle conditions can include monitoring a location of the electrified vehicle 10 relative to a traffic lane. The alert event associated with such a condition would be detecting that the electrified vehicle 10 has moved from the traffic lane. Other exemplary external vehicle conditions could include monitoring for upcoming intersections or obstacles, changes to a speed limit, or poor driving conditions, such as rain or snow. The external vehicle conditions can be monitored by the electrified vehicle 10 via sensor devices such as a camera, Lidar sensor, etc.

External communications are generally communications that originate from outside the electrified vehicle 10 and are communicated to the electrified vehicle 10. Alert events provided by external communications could include a message sent to the electrified vehicle 10 from a toll stations, an emergency vehicle, or a weather station. The external communications can be sent wirelessly to the electrified vehicle 10 as understood.

With reference now to FIG. 8 and continued reference to FIG. 2, an exemplary vehicle alert method 200 adjusts sound emitted from the electrified vehicle powertrain 30 to provide alerts in response to an alert event. The method 200 begins at steps 210a, 210b, and 210c where the internal vehicle conditions, external vehicle conditions, and external communications are monitored.

At steps 214a, 214b, and 214c, the method 200 assesses if the monitoring has detected any alert event. If yes, the method 200 moves to a step 218 where the power characteristic control system 18 alters power delivered within the electrified vehicle powertrain 30 to cause at least one component of the electrified vehicle powertrain 30 to emit a plurality of different acoustic tones that follow a predetermined sequence.

The step 218 thus adjusts sound emitted from the electrified vehicle powertrain 30. The adjusted sound provides an alert in response to an alert event. That is, the different acoustic tones following the predetermined sequence that are emitted in response to the alert events can alert the driver. In an example, a driver perceives the alert and, in response, looks at a fuel gage to understand that the electrified vehicle 10 has a low level of fuel.

The predetermined sequence of acoustic tones continues until the method 200, at a step 222, assesses that the predetermined sequence has ended. The method 200 then, at a step 226, resumes a default power delivery to the electrified vehicle powertrain 30. The default power delivery is not intended to provide an alert in this example.

With reference now to FIG. 9 and continuing reference to FIG. 2, a vehicle alert method 300 according to another exemplary embodiment begins at steps 310a, 310b, and 310C where the method 300 monitors the internal vehicle conditions, external vehicle conditions, and external communications. At steps 314a, 314b, and 314c, the method 300 assesses if the monitoring has detected any alert event. If yes, the method 300 moves to a step 318 where the power characteristic control system 18 alters at least one characteristic of power delivered within the electrified vehicle powertrain 30 to cause at least one component of the electrified vehicle powertrain 30 to emit a plurality of different acoustic tones that follow a predetermined sequence.

In contrast to the method 200, the method 300 then continues the predetermined sequence until the alert event (i.e., alert event) is removed. At a step 322, the alert event is monitored to see if the alert event has been removed. If not, the method 300 moves to the step 326 where the power characteristic control system 18 continues to alter characteristics of power to the electrified vehicle powertrain 30 to cause the electrified vehicle powertrain 30 to continue to emit a plurality of different acoustic tones that follow a predetermined sequence.

If, at the step 322, the alert event has been removed, the step 330 where the default method power delivery to the electrified vehicle powertrain 30 is continued. At the step 322, if the alert event is removed, the method 300 then moves to the step 330 where the method 300 resumes a default power delivery to the electrified vehicle powertrain 30. The default power delivery is not intended to provide an alert.

As an example, if the external vehicle information monitored at the step 310b detects an alert event at the step 314b where the electrified vehicle 10 is drifting from a lane, the predetermined sequence of acoustic tones will begin to play at the step 318. If a user of the vehicle corrects a position of the electrified vehicle 10 such that the electrified vehicle 10 returns to the lane, the alert event is removed. The method 300 then moves to the step 330, which effectively stops the alert provided by the different acoustic tones following the predetermined sequence. If, however, the electrified vehicle 10 continues to drift from the lane, the different acoustic tones following the predetermined sequence will continue to play. If the acoustic sequence has not ended, the user of the electrified vehicle 10 will continue to perceive the alert provided by the acoustic sequence until the electrified vehicle 10 returns to the lane.

The method 300 of FIG. 9 is particularly useful in connection with alert events that are transient in nature and relatively less predictable. Lane departure, as mentioned above, is one such alert. Another is alert event corresponding to receipt of an external communication indicated that an emergency vehicle is nearby.

With reference now to FIG. 10, an alert selection method 400 can respond to different triggering conditions by playing different predetermined sequences of a plurality of different acoustic tones. Basically, a specific alert sequence can be selected based on the alert event.

The method 400 begins at steps 410a, 410b, and 410c where the method 400 monitors the internal vehicle conditions, external vehicle conditions, and external communications. The method 400 also assesses if the monitoring has detected any alert event. The detection steps are omitted here for clarity.

If an alert event is detected, the method 400 moves to a step 414 where the method 400 selects an alert by selecting an appropriate plurality of different acoustic tones that follow an appropriate predetermined sequence. The acoustic tones, the sequence, or both can be selected based on the alert event. The step 414 may, for example, select a first predetermined sequence of acoustic tones if a fuel level of the electrified vehicle 10 falls behold a threshold value. The step 414 may, for example, select a second predetermined sequence of acoustic tones if the electrified vehicle 10 receives an external communication indicating an emergency vehicle is nearby.

The method 400 then moves to the step 418 where the sequence of acoustic tones selected in the step 414 begins. The method 400 can then continue in the matter of the method 200 of FIG. 8, or the method 300 of FIG. 9.

With reference now to FIG. 11 and continued reference to FIG. 1, a method 500 adjusts, over time, the predetermined sequence of different acoustic tones that are played in response to an alert event. The method 500 begins at steps 510a, 510b, and 510c where the method 300 monitors the internal vehicle conditions, external vehicle conditions, and external communications. The method 500 also assesses if the monitoring has detected any alert event. The detection steps are omitted here for clarity. If an alert event is detected, the method 500 moves to the step 520.

At a step 520, the method 500 determines if the detected alert event requires urgent action. If yes, the method 500 moves to a step 530 that executes the predetermined sequence of acoustic tones. The step 520 could be omitted in some examples.

From the step 520, the method 500 moves to a step 540 which continues begins to alter characteristics of the power delivered within the electrified vehicle powertrain 30 to cause the electrified vehicle powertrain 30 to emit the plurality of different acoustic tones that follow a predetermined sequence.

The predetermined sequence continues at a step 540, which assesses whether or not the alert event has been removed. If the alert event is not removed, the method 500 moves to a step 550 were the method 500 can change in frequency, sound, level, pattern, or some combination of these at the step 550. The acoustic tones and predetermined sequence may, for example, be adjusted to become increasingly more perceivable to the user of the electrified vehicle 10 by increasing their frequency and harshness. This can be particularly advantageous if the user is not responding by removing the alert event.

If the alert event is removed at the step 540, the method 500 moves to a step 560 where the method 500 resumes a default power delivery to the electrified vehicle powertrain 30. The default power delivery is not intended to provide an alert.

Features of the disclosed examples include, in response to an alert event, altering at least one characteristic of power delivered to an electrified vehicle powertrain to cause the powertrain to emit acoustic tones that provide an alert to a user of the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle alert method, comprising:
    detecting an alert event; and
    in response to the alert event, altering at least one characteristic of power delivered within an electrified vehicle powertrain to provide an alert from the electrified vehicle powertrain, the alert provided by at least one component of the electrified vehicle powertrain emitting a plurality of different acoustic tones that follow a predetermined sequence; and
    selecting the plurality of different acoustic tones, the predetermined sequence, or both based on the alert event.

2. The vehicle alert method of claim 1, wherein the altering comprises changing a switching pattern of the power when pulse width modulating the power.

3. The vehicle alert method of claim 1, wherein a power output from the electrified vehicle powertrain is maintained during the altering.

4. The vehicle alert method of claim 1, wherein the alert event is a detected change in an internal vehicle condition.

5. The vehicle alert method of claim 1, wherein the alert event is a detected change in a condition external to the vehicle.

6. The vehicle alert method of claim 5, wherein the alert event is sensed by at least one sensor of the vehicle.

7. The vehicle alert method of claim 1, wherein the alert event is a communication to the vehicle from a communication source external to the vehicle.

8. The vehicle alert method of claim 1, further comprising continuing to provide the alert until the alert event is removed.

9. The vehicle alert method of claim 1, further comprising altering the plurality of different acoustic tones, the predetermined sequence, or both based on a duration of the alert event.

10. The vehicle alert method of claim 1, wherein the predetermined sequence includes at least two different acoustic tones.

11. The vehicle alert method of claim 1, wherein the predetermined sequence includes at least one first acoustic tone emitted for a first duration, and at least one different, second acoustic tone emitted for a different, second duration.

12. The vehicle alert method of claim 1, wherein the different acoustic tones comprise different inaudible sounds.

13. A vehicle alert assembly, comprising:
    a power characteristic control system that can detect an alert event and, in response to the alert event, alters at least one characteristic of power delivered within an electrified vehicle powertrain to provide the alert from the electrified vehicle powertrain, wherein the alert from the electrified vehicle powertrain is provided without broadcasting the alert through at least one speaker of the vehicle.

14. The vehicle alert assembly of claim 13, wherein altering the at least one characteristic of the power in response to the alert event causes at least one component of the electrified vehicle powertrain to emit a plurality of different acoustic tones that follow a predetermined sequence.

15. The vehicle alert assembly of claim 14, further comprising an electric machine as the at least one component, the power characteristic control system configured to alter the at least one characteristic of power delivered to the electric machine.

16. The vehicle alert assembly of claim 15, further comprising a traction battery that powers the electric machine.

17. The vehicle alert assembly of claim 14, wherein the acoustic tones comprise audible sounds and inaudible sounds.

18. The vehicle assembly of claim 13, wherein the power characteristic control system alters the at least one characteristic of the power by changing a switching frequency of the power when pulse width modulating the power.

19. A vehicle alert method, comprising:
    detecting an alert event;
    in response to the alert event, altering at least one characteristic of power delivered within an electrified vehicle powertrain to provide an alert from the electrified vehicle powertrain; and providing the alert without broadcasting the alert through at least one speaker of the vehicle.

* * * * *